F. W. HARRIS.
ELECTRIC SWITCHING DEVICE.
APPLICATION FILED MAR. 9, 1908.

975,418.

Patented Nov. 15, 1910.
2 SHEETS—SHEET 1.

WITNESSES:
Fred H. Miller
R. J. Dearborn

INVENTOR
Ford W. Harris
BY
Wesley G. Carr
ATTORNEY

F. W. HARRIS.
ELECTRIC SWITCHING DEVICE.
APPLICATION FILED MAR. 9, 1908.
975,418.
Patented Nov. 15, 1910.
2 SHEETS—SHEET 2.
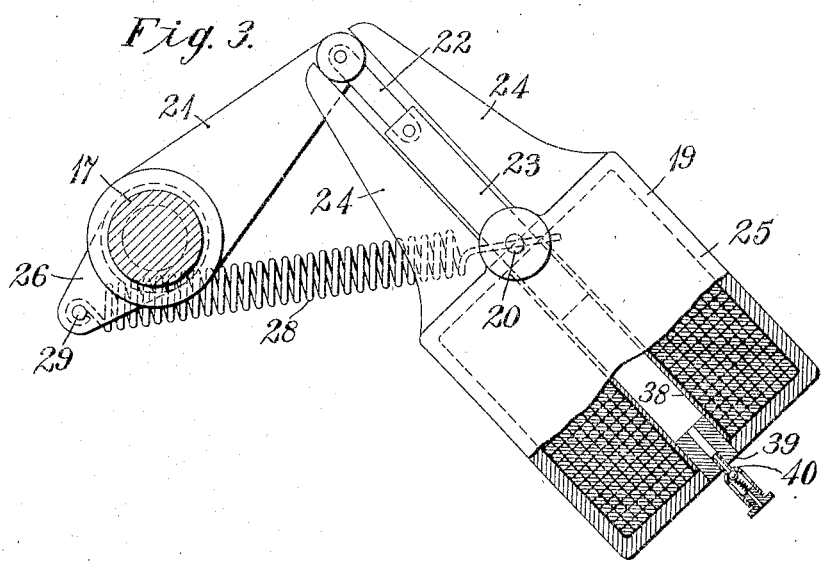
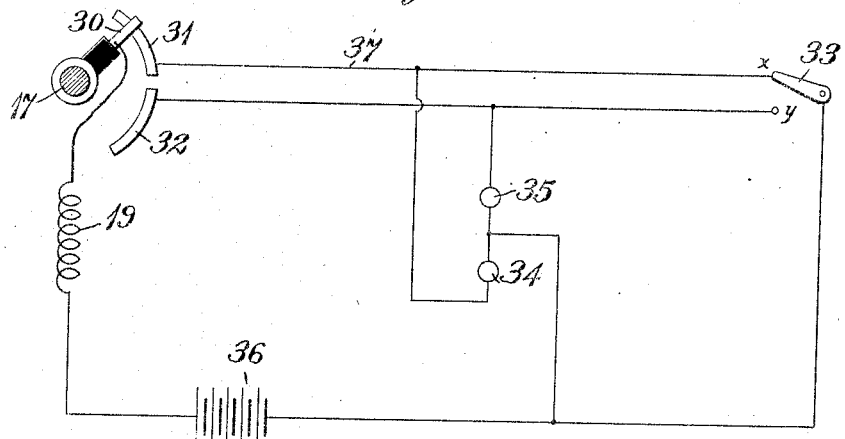
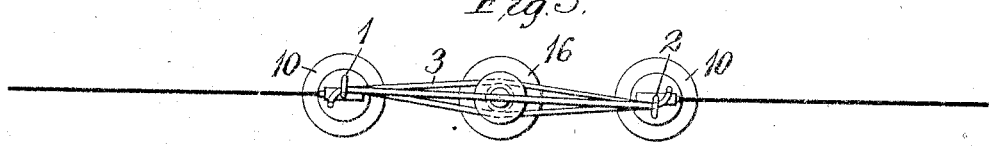
WITNESSES:
Fred H. Miller
INVENTOR
Ford W. Harris
BY
ATTORNEY

UNITED STATES PATENT OFFICE.

FORD W. HARRIS, OF WILKINSBURG, PENNSYLVANIA, ASSIGNOR, BY MESNE ASSIGNMENTS, TO WESTINGHOUSE ELECTRIC & MANUFACTURING COMPANY, OF EAST PITTSBURG, PENNSYLVANIA, A CORPORATION OF PENNSYLVANIA.

ELECTRIC SWITCHING DEVICE.

975,418.  Specification of Letters Patent.  Patented Nov. 15, 1910.

Application filed March 9, 1908. Serial No. 420,061.

*To all whom it may concern:*

Be it known that I, FORD W. HARRIS, a citizen of the United States, and a resident of Wilkinsburg, in the county of Allegheny and State of Pennsylvania, have invented a new and useful Improvement in Electric Switching Devices, of which the following is a specification.

My invention relates to switching devices for electric circuits, and it has special reference to electrically operated switches that are adapted for the interruption of relatively high-voltage lines.

The object of my invention is to provide a device of the class above indicated that shall be simple and inexpensive in construction, and be capable of remote control and, at the same time, be adapted to interrupt high-voltage circuits in the open air.

It is sometimes advantageous to entirely interrupt the circuits which connect switchboards and electrical apparatus within substations and like buildings to high-voltage transmission lines, in order to safely inspect and repair the oil-immersed or other indoor circuit-breakers which are usually relied upon for interrupting the circuits under overloads and similar conditions that render such action necessary or desirable.

According to my present invention, I provide an electrically operated switch which may be mounted in the open air at the top of a pole where it is out of reach of the ignorant and curious and where little or no damage can result from the arcs that occur when very high-voltage circuits are interrupted. This switch comprises, in general, a pair of stationary contact members which are supported on porcelain insulators of a well known type and a movable contact member which is mounted on a third insulator that is located between the other two and is rotatably mounted so that the movable member may either bridge the air-gap between the stationary contact members or be separated from each of them by a material distance.

Figure 1:
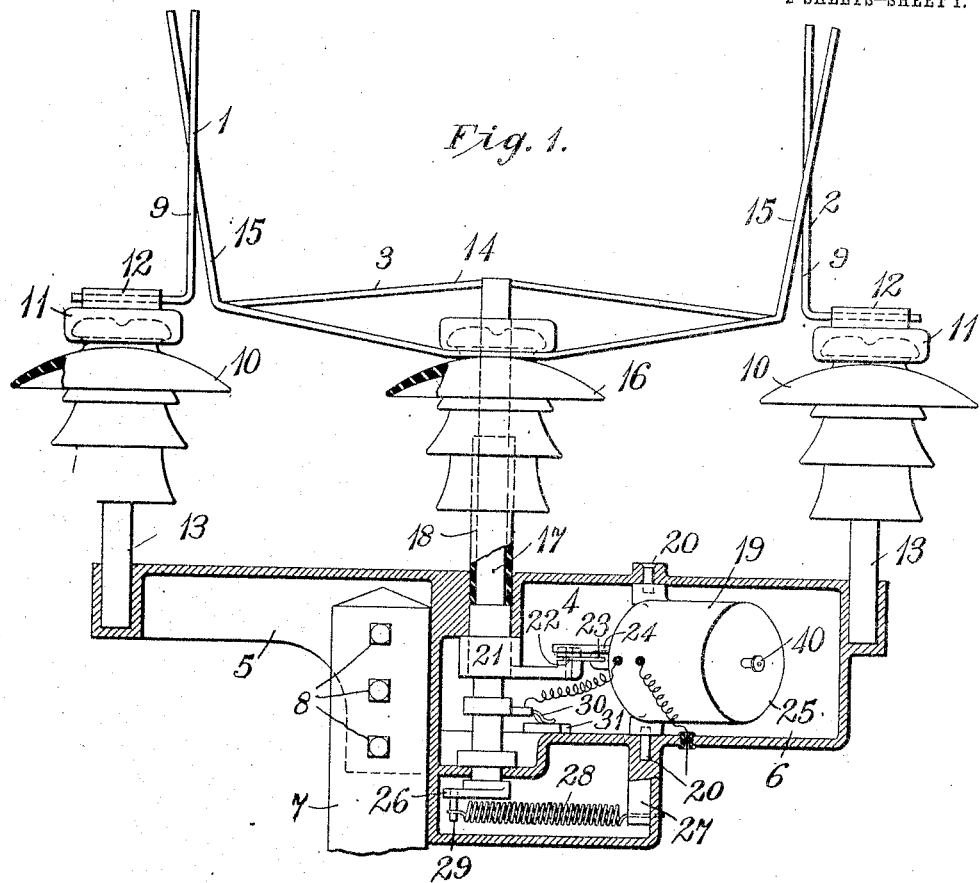
Figure 2:
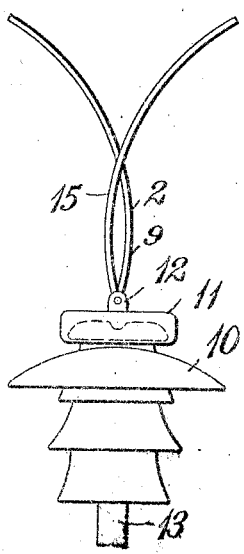

Figure 1 of the accompanying drawings is an elevation of a switching device constructed in accordance with my invention, and Fig. 2 is an elevation of a portion of the device, at right angles to that of Fig. 1. Fig. 3 is a plan view of the operating mechanism of Figs. 1 and 2. Fig. 4 is a diagrammatic plan view of one system of circuit connections by which the device of the other figures may be operated and controlled, and Fig. 5 is a plan view of the contact terminals and insulators shown in Figs. 1 and 2.

Referring to Figs. 1, 2, 3 and 5 of the drawings, the device herein illustrated comprises stationary contact members 1 and 2, a movable bridging contact member 3, an operating mechanism 4 and a stationary frame 5 which includes a casing 6 for the operating mechanism. The stationary frame 5 may be secured to the top of a pole 7 by bolts 8 or it may be supported in any other suitable manner. The stationary contact members 1 and 2 are similar to each other and each comprises a horn or bow-shaped rod 9 which is secured to the top of an insulator 10, of any well known high voltage type, by means of a cap 11, the lower extremity of the rod being bent at right angles to its body and inserted in a loop projection 12 with which the cap is provided. The insulators 10 are mounted, in the usual manner, on pins 13 which are secured to, and project upwardly from, the outer ends of the supporting frame 5. The frame 5 has the general form of a cross arm and is preferably constructed of cast iron.

The movable contact member comprises a resilient arm 14 having rods 15 projecting upwardly and outwardly from its ends and it is secured substantially at its middle point to the top of an insulator 16 which is affixed to a rotatably mounted vertical shaft 17. The portion of the shaft 17 which is between the insulator 16 and the frame 5 is protected by a hard insulating tube or bushing 18 that is sealed to the frame so that the operating mechanism may be protected, as far as possible, from the effects of the weather. The tube 18 is preferably constructed of insulating material rather than of metal, in order to avoid the induction of static fields which would otherwise obtain and, since the tube forms a water-tight joint with the frame and extends well up under the petticoat of the insulator 16, the possibility of damaging the mechanism by dampness or rain is excluded.

The operating mechanism 4 comprises an electro-magnet 19, which is rotatably mounted in a horizontal plane between a pair of stationary pin projections 20 that extend inwardly from the walls of the casing 6 and are in a line parallel to the axis of the shaft 17 and at some distance from it, and an operating lever 21 which is secured to the shaft 17 and is pivotally connected at its outer end to a projection 22 from a relatively movable core member 23 of the electro-magnet 19, (see Fig. 3). The core member 23 is guided in its movement by the projections 24 of a casing 25 which surrounds the winding of the electro-magnet and is rotatably mounted, as above indicated.

An arm 26 projects from the lower end of the shaft 17 in a direction substantially opposite to that of the lever 21 and its outer end is connected to a stationary projection 27 of the frame 5 by means of a spring 28, one end of the spring being attached to the projection 27, in line with the pivotal axis of the electro-magnet 19 and the other end being secured to a pin 29 that projects from the free end of the arm 26.

The movable core member 23 makes a close sliding fit within a tube 38 the outer end of which is provided with a plug 39 having a check valve 40 to permit air to flow only in an outward direction, a dash-pot action being thereby produced to retard the outward movement of the core member. Since the magnet 19 is rotatably mounted, its winding is connected to the auxiliary circuits of the device by flexible leads (see Figs. 1 and 4).

The shaft 17 is provided with an insulated auxiliary switch contact arm 30 which engages the one or the other of two stationary contact members 31 and 32, according as the main switch occupies its open or its closed position.

The operation of the device is as follows: Assuming that the main switch occupies its closed position, as shown in Figs. 1, 2 and 5, and that the operating mechanism and the auxiliary switch are arranged as shown in Figs. 3 and 4; if it is desired to interrupt the circuit which is completed through bridging contact member 3, the electro-magnet 19 is energized, and the movable core member 23 is actuated to produce such rotative movement of the shaft 17 as will place the spring 28 under tension. This electro-magnetic influence is sufficient to cause an initial rotation of the moving parts which have considerable inertia, since they are relatively heavy, and the pin 29 on the arm 26 is carried across a horizontal line through the axes of rotation of the electro-magnet 19 and the shaft 17 so that the tension of the spring tends to produce a still greater degree of rotation of the shaft 17. In this way, the operating contact arm 3 is moved, through an angle of substantially 90°, from a position of engagement with the stationary contact members to one of maximum separation therefrom, the final movement being retarded by the dash-pot action above described.

The function of the auxiliary switch is illustrated in Fig. 4, to which special reference may now be had. A manually operated control switch 33 and indicating lamps 34 and 35, preferably of different colors, may be located at any distance from the disconnecting switch and usually within the sub-station or at some other point where they may be readily accessible to an attendant. If the auxiliary switch 30 occupies the position shown in Fig. 4, and the control switch 33 is moved to position $x$, a circuit is established from one terminal of a battery 36 through electro-magnet 19, switch arm 30, contact member 31, conductor 37, and switch 33 to the opposite terminal of the battery, a branch circuit of relatively high resistance being established through conductor 37 and the indicating lamp 34 to the battery terminal. It will be understood that the resistance of the circuit containing the switch 33 is such as to insure the passage of some current through the lamp which is connected in parallel circuit with the switch. The electro-magnet 19 being thus energized, the main disconnecting switch will be moved to its open position, as above indicated, and the auxiliary switch arm 30 will be moved into engagement with the contact member 32. The new positions of the two switches, which are indicated by the lamp 35, will be maintained until the control switch 33 is moved to position $y$. Movement of the switch 33 to position $y$ will permit the battery to again energize the magnet 19 sufficiently to effect operation of the main and auxiliary switches in the reverse order to that just described.

It will be readily understood, by those familiar with the art, that the circuit-breaker illustrated is adapted for very high voltage circuits and that it has also the advantage of being electrically operated, and is capable of remote control as well as being very cheap and simple in construction.

It will be understood that various structural modifications may be effected in the device illustrated in the drawings without departing from the spirit of my invention, and I therefore desire that only such limitations shall be imposed as are indicated in the appended claims.

I claim as my invention:

1. In a switching device, the combination with a supporting frame, pins projecting upwardly from the ends thereof and provided with insulators, and stationary contact members projecting upwardly from said insulators, of an insulator rotatably mounted substantially midway between the stationary contact members, a bridging member secured to the rotatable insulator and provided with upwardly projecting arms which are adapted to make sidewise engagement with said stationary contact members, a spring tending to hold the bridging member at one end of a 90° arc of rotation, and electromagnetic means for effecting an initial rotative movement of said bridging member from either of its extreme positions.

2. In a switching device, the combination with a hollow supporting frame, two insulators secured thereto and projecting upwardly therefrom, and stationary contact members projecting upwardly from said insulators, of a rotatably mounted intermediate insulator, a coöperating bridging member secured to the rotatably mounted insulator and provided with upwardly projecting contact arms which are adapted to make sidewise engagement with said stationary contact members, and operating means disposed in said hollow supporting frame.

3. In a switching device, the combination with a hollow supporting frame, pins projecting upwardly therefrom and provided with insulators, and horn-shaped stationary contact members projecting upwardly from said insulators, of a shaft rotatably mounted between the stationary insulators and projecting into the hollow supporting frame, an insulator mounted on said shaft, a bridging member secured to the rotatable insulator and provided with upwardly projecting arms which are adapted to make sidewise engagement with said stationary contact members, and means disposed in the hollow frame for producing a rotative movement of the shaft through an angle of substantially ninety degrees.

4. In a switching device, the combination with a supporting frame, two insulators secured thereto and projecting upwardly therefrom, and horn-shaped stationary contact members projecting upwardly from said insulators, of a rotatably mounted intermediate insulator, a coöperating movable bridging member secured to said rotatably mounted insulator and having upwardly projecting contact arms which are adapted to make sidewise engagement with said stationary contact members, remotely controlled means for imparting an initial rotative movement to said rotatably mounted insulator, and a spring for continuing said movement through an angle of substantially ninety degrees.

5. In a switching device, the combination with a supporting frame, pins projecting upwardly from the ends thereof and provided with insulators, and stationary contact members projecting upwardly from said insulators, of a rotatable shaft located between the stationary contact members, a bridging member secured to the rotatable shaft and having upwardly projecting contact arms, a spring tending to hold the bridging member at one end of a ninety degree arc of rotation, a lever arm projecting laterally from said shaft, an electro-magnet rotatably mounted with its axis parallel to that of the shaft and having a movable contact member connected to the laterally projecting lever arm.

6. In a switching device, the combination with a pair of stationary contact members, a shaft rotatably mounted between said members, a hollow supporting frame for the aforesaid parts, a petticoat insulator mounted on the outer end of the shaft, and a movable contact member secured to the insulator, of an insulating tube surrounding the shaft and making a water-tight joint with the supporting frame and extending under the petticoat of the insulator, operating means for producing an initial rotation of the movable member, a spring tending to complete the motion through a ninety degree arc, and a dash-pot for retarding the final movement.

In testimony whereof, I have hereunto subscribed my name this 21st day of February, 1908.

FORD W. HARRIS.

Witnesses:
BIRNEY HINES,
HERBERT FABER.